United States Patent [19]

Jaskowiak

[11] Patent Number: 4,964,034
[45] Date of Patent: Oct. 16, 1990

[54] SYNCHRONIZED PROCESSING SYSTEM WITH BUS ARBITER WHICH SAMPLES AND STORES BUS REQUEST SIGNALS AND SYNCHRONIZES BUS GRANT SIGNALS ACCORDING TO CLOCK SIGNALS

[75] Inventor: Kenneth R. Jaskowiak, Milford, Mass.

[73] Assignee: Raytheon Company, Lexington, Mass.

[21] Appl. No.: 237,675

[22] Filed: Aug. 25, 1988

Related U.S. Application Data

[63] Continuation of Ser. No. 45,794, Apr. 20, 1987, abandoned, which is a continuation of Ser. No. 666,531, Oct. 30, 1984, abandoned.

[51] Int. Cl.⁵ .................... G06F 13/18; G06F 13/36
[52] U.S. Cl. .................... 364/200; 364/229.2; 364/242.92; 364/240.4; 364/270.6
[58] Field of Search ... 364/200 MS File, 900 MS File; 340/825.5

[56] References Cited

U.S. PATENT DOCUMENTS

| | | | |
|---|---|---|---|
| 3,543,242 | 11/1970 | Adams, Jr. et al. | 364/200 |
| 3,832,692 | 8/1974 | Henzel et al. | 340/17.5 |
| 3,921,145 | 11/1975 | Emm et al. | 364/200 |
| 4,090,238 | 5/1978 | Russo | 364/200 |
| 4,229,791 | 10/1980 | Levy et al. | 364/200 |
| 4,229,792 | 10/1980 | Jensen et al. | 364/200 |
| 4,237,534 | 12/1980 | Felix | 364/200 |
| 4,339,808 | 7/1982 | North | 364/900 |
| 4,402,040 | 8/1983 | Evett | 364/200 |
| 4,422,142 | 12/1983 | Inaba et al. | 364/200 |
| 4,449,183 | 5/1984 | Flahive et al. | 364/200 |
| 4,493,036 | 1/1985 | Boudreau et al. | 364/200 |
| 4,523,277 | 6/1985 | Schnathorst | 364/200 |
| 4,604,685 | 8/1986 | Brown et al. | 364/200 |
| 4,627,018 | 12/1986 | Trost et al. | 364/900 |
| 4,630,041 | 12/1986 | Casamatta et al. | 364/200 X |
| 4,654,788 | 3/1987 | Boudreau et al. | 364/200 |
| 4,665,483 | 5/1987 | Ciacci et al. | 364/200 |

FOREIGN PATENT DOCUMENTS

| | | |
|---|---|---|
| 1331786 | 9/1971 | United Kingdom . |
| 1449391 | 10/1973 | United Kingdom . |
| 1593885 | 10/1976 | United Kingdom . |
| 2070824A | 2/1980 | United Kingdom . |

Primary Examiner—Thomas C. Lee
Attorney, Agent, or Firm—Walter F. Dawson; Richard M. Sharkansky

[57] ABSTRACT

A digital system bus arbiter network which provides prioritized but equal opportunity for various devices to gain access to a common bus. The network samples the state of all pending requests for bus access, stores the current requests and generates a sequence of bus access granting signals in an order determined by the priority of the stored bus requests. When all of the bus requests have been processed for a given sample period, the network resamples currently pending bus requests and repeats the process of generating the sequence of bus granting signals on a prioritized basis. The network guarantees an equal share of bus bandwidth to each device.

16 Claims, 8 Drawing Sheets

SYNCHRONIZED PROCESSING SYSTEM WITH BUS ARBITER WHICH SAMPLES AND STORES BUS REQUEST SIGNALS AND SYNCHRONIZES BUS GRANT SIGNALS ACCORDING TO CLOCK SIGNALS

This invention was made with Government support under Contract No. NA-83-SAC-00619 awarded by the Department of Commerce. The Government has rights in this invention.

This application is a continuation of application Ser. No. 045,794, filed Apr. 20, 1987, now abandoned. This application is a continuation of application Ser. No. 666,531, filed Oct. 30, 1984, now abandoned.

BACKGROUND OF THE INVENTION

This invention relates generally to digital systems and in particular to systems comprising a plurality of devices interconnected by a common bus having a bus arbiter for determining which one of the devices shall have first access to the common bus when more than one device is requesting use thereof. The devices may be processors, memories and/or input-output controllers.

Bus arbitration is generally accomplished by distributed or centralized arbitration techniques. In a distributed arbitration system each of the devices connected to the common bus comprises an arbitration network as described in a patent to Evett, U.S. Pat. No. 4,402,040 which is assigned to the same assignee as the present invention. In such a distributed arbitration system, the arbitration network in each device determines the device's priority relative to other devices based on a code generated by each device. This approach is often used in high reliability or fault-tolerant systems where single point failures cannot be tolerated. In a centralized arbitration system, a single bus arbiter determines which one of a plurality of devices will be granted access to a common bus based on assigned priority to each device. However, if one or two of the higher priority devices monopolize the bus, then lower priority devices are prevented from ever using it. Thus, there is a need for a bus arbiter that will allow all devices to have an equalized opportunity to have common bus access.

SUMMARY OF THE INVENTION

In accordance with the present invention a bus arbiter is provided for determining which one of a plurality of devices interconnected by a common bus has priority for obtaining access to the bus and further insures that each of the devices will obtain periodic access to the bus. In response to a series of sampling signals bus access requests generated by the devices are sampled and stored. The requesting devices are granted access to the bus in accordance with a predetermined priority. However, each of the requesting devices is granted access to the bus prior to the occurrence of the next succeeding sampling signal. In this manner equal access to the bus is obtained for all of the devices.

In a preferred embodiment the bus arbiter comprises: a plurality of devices interconnected by a common bus; means for producing a series of sampling signals; means for sampling and storing bus request signals in response to each one of the series of the sampling signals; means for converting the sampled bus request signals into a sequence of bus granting signals; means for executing the bus granting signals in a period of time between successive sampling signals.

In accordance with a further feature of the invention a method is provided for enabling a plurality of devices with predetermined prioritization to have equal access to a common bus of a digital system in response to bus access requests from said devices comprising the steps of sampling a first plurality of the bus requests in response to a sampling signal, storing the plurality of sampled bus requests in a memory means, generating a sequence of bus grant signals, based on a preferred priority order of the bus requests from the devices, to obtain bus access based on the device having the highest priority of the sampled bus requests, resetting one of the stored bus requests, for the device having generated the current highest priority one of said stored bus requests, immediately following the generating of said one of the bus grant signals in the sequence, and sampling a subsequent plurality of the bus requests in response to a next one of the sampling signals when all of a prior plurality of stored bus requests have been reset.

BRIEF DESCRIPTION OF THE DRAWINGS

The above-mentioned aspects and other features of the invention are explained more fully in the following description taken in connection with the accompanying drawings, in which.

DESCRIPTION OF THE PREFERRED EMBODIMENT

Figure 1:
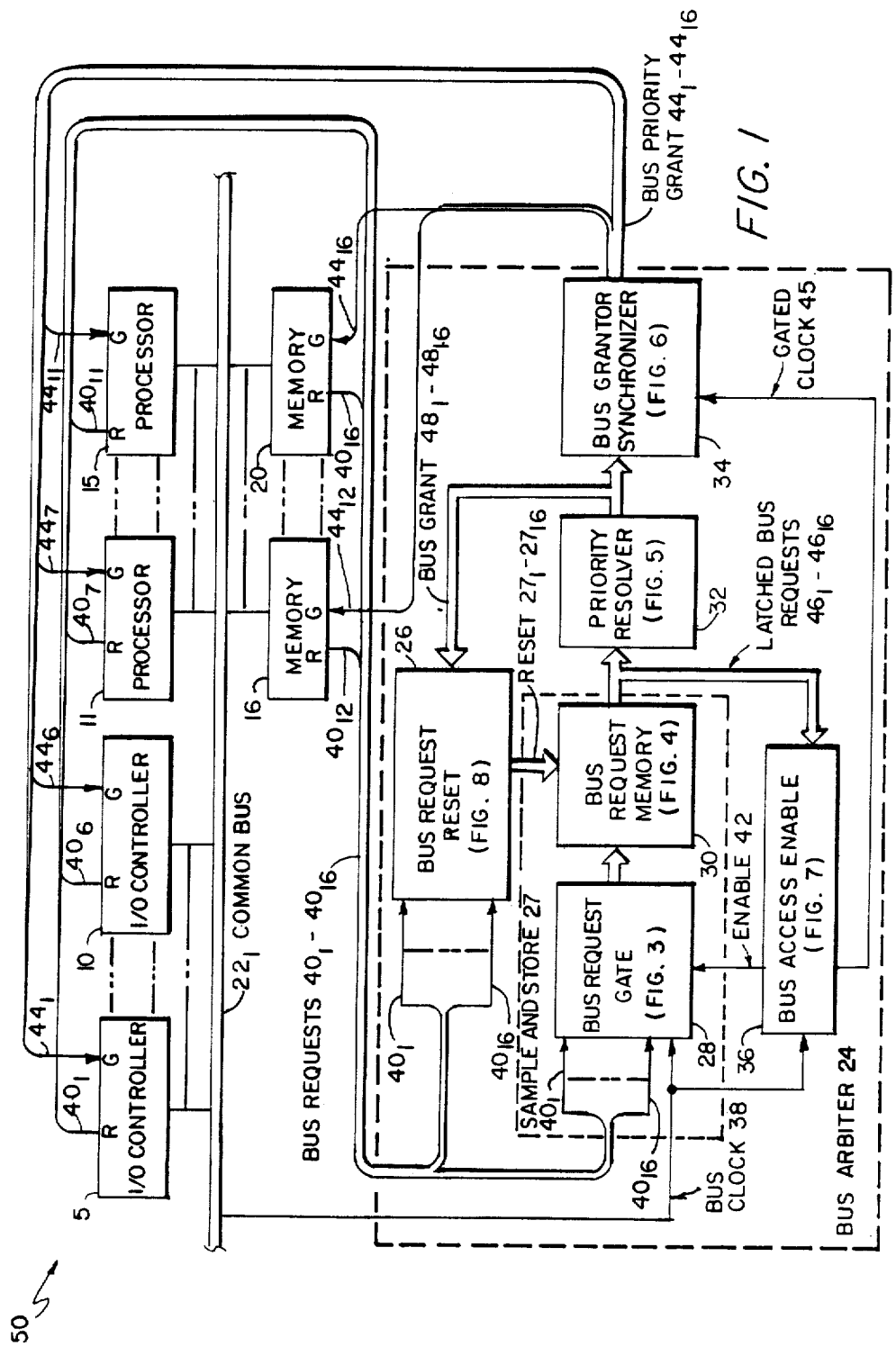
FIG. 1 is a functional block diagram of a computer system comprising a plurality of devices interconnected by a common bus and having a bus arbiter for determining device access to the common bus.

Referring first to FIG. 1, there is shown a block diagram of a generalized computer system 50 comprising a plurality of devices including I/O controllers 5-10, processors 11-15, and memories 16-20. These devices are interconnected by a common bus 22 and coupled to each of the plurality of devices 5-20 is a bus arbiter 24 for determining the priority of device access to the common bus 22 during a series of sample periods. The bus arbiter 24 provides an equal opportunity for each of the devices 5-20 to gain access to the common bus 22 in accordance with bus request signals $40_1$–$40_{16}$ generated by each of the devices 5-20 and fed to the bus arbiter 24 where they are converted into a sequence of bus priority grant signals $44_1$–$44_{16}$. The number of devices 5-20 in computer system 50 is somewhat arbitrary; however, in the preferred embodiment shown in FIG. 1, the bus arbiter 24 has been designed to handle a total of 16 bus requests from 16 devices which may be any combination of the I/O controllers 5–10, processors 11–15, and memories 16–20.

The bus arbiter 24 as shown in FIG. 1 determines the priority order in which the plurality of devices 5–20 interconnected by common bus 22 will gain access to the bus 22 during each one of the series of sample periods, and also permits each one of said devices 5–20 to have an equal opportunity with respect to the other devices for bus access by virtue of the series of sample periods. Bus arbiter 24 comprises a sample and store 27 network which receives up to 16 bus request signals $40_1$–$40_{16}$ from any combination of the devices 5–20 connected to bus 22. The sample and store 27 network comprises a bus request gate 28 coupled to a bus request memory 30 for storage of said bus requests signals $40_1$–$40_{16}$ upon the occurrence of one of a series of sample or enable signals 42. A priority resolver 32 coupled to the outputs of bus request memory 30 converts the bus requests signals $40_1$–$40_{16}$ which are sampled by the series of enable signals 42 into a sequence of bus grant signals $48_1$–$48_8$. Priority resolver 32 determines which one of the stored or latched bus requests $46_1$–$46_{16}$ has the highest priority and generates the sequence of bus grant signals $48_1$–$48_{16}$ to the bus grantor synchronizer 34 (and to the bus request reset 26) in accordance with the priority established for each of the latched bus requests $46_1$–$46_{16}$. The bus grantor synchronizer 34 generates bus priority grant signals $44_1$–$44_{16}$ which are synchronized with the bus clock 38 and sent to the device having the highest priority of all the devices 5–20 requesting access to bus 22 that were sampled and stored in the bus request memory 30. The bus clock 38 is coupled from common bus 22 to the bus request gate 28 and bus access enable 36. In the bus access enable 36, the bus clock 38 is gated by the enable signal 42 forming the gated clock signal 45 which is used to synchronize the bus priority grant signals $44_1$–$44_{16}$ for each of the devices 5–20. The enable signal 42, generated by the bus access enable 36, clocks a new set of bus requests signals $40_1$–$40_{16}$ into the bus request memory 30 after all previous bus requests stored in said memory 30 have been processed. Monitoring the latched bus request signals $46_1$–$46_{16}$ from the bus request memory 30 determines when all of the previously stored bus requests $40_1$–$40_{16}$ have been processed. The bus grant signals $48_1$–$48_{16}$ generated by the priority resolver 32 are coupled to a bus request reset 26 which also receives the bus requests signals $40_1$–$40_{16}$. The bus request reset 26 generates one of the reset signals $27_1$–$27_{16}$ for one of the storage elements in the bus request memory 30 after a device which generated the corresponding one of the bus requests $40_1$–$40_{16}$ stored in said memory 30 has been granted access to the bus 22. The resetting of the most recently processed one of the latched bus requests $46_1$–$46_{16}$ enables the priority resolver 32 to determine which one of the remaining stored bus requests $46_1$–$46_{16}$ in the bus request memory 30 should be processed next based on a preferred priority order, or if the bus request memory 30 is empty, the bus access enable 36 permits the sampling of a new set of bus requests $40_1$–$40_{16}$ for storage in bus request memory 30.

Figure 2:
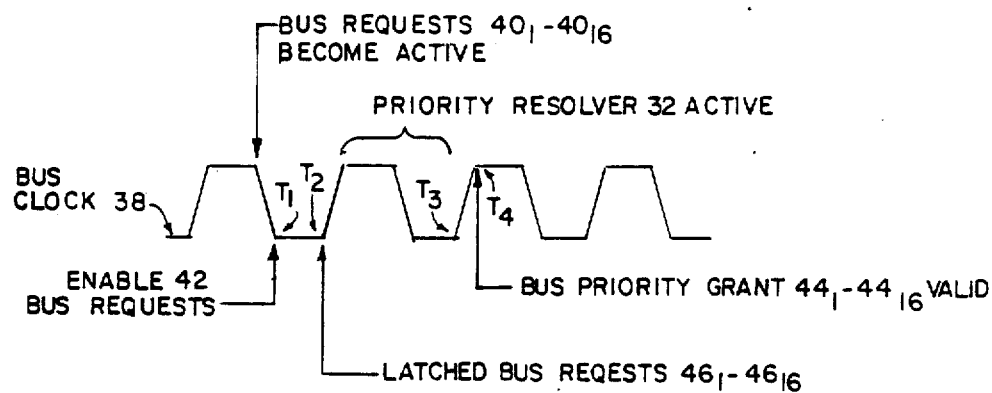
FIG. 2 shows a bus clock and bus arbiter timing events occurring at various transitions of the bus clock.

Referring now to FIG. 2, the bus clock 38 signal is shown along with timing events being noted at the various transitions of the bus clock 38. At time T1, any active bus requests $40_1$–$40_{16}$ are gated into the bus request memory 30 by the enable signal 42. At time T2, the latched bus requests signals $46_1$–$46_{16}$ are coupled to the priority resolver 32 which proceeds to determine the highest priority device requesting access to bus 22. This priority determination takes place between T2 and T3 resulting in the generation of one of the bus grant signals $48_1$–$48_{16}$ which is coupled to the bus grantor synchronizer 34. At time T4, one of the bus priority grant signals $44_1$–$44_{16}$ is generated and sent to the device currently having the highest priority for obtaining bus 22 access.

Some of the logic used to implement the functions of the bus arbiter 24 as shown in FIG. 1., utilizes programmable array logic such as that developed by Monolithic Memories, Inc., of Santa Clara, Calif. 95050. Programmable array logic may efficiently solve system partitioning and interface problems brought about by increases in semiconductor device technology, and it is an extension of the fusible link technology used in a bipolar programmable read-only memory (PROM). The fusible link PROM first provided the capability to "write on silicon." In a few seconds, a blank PROM is transferred from a general purpose device into one containing a custom algorithm, microprogram, or Boolean transfer function. This has opened up new horizons for the use of PROMs in computer controlled stores, character generators, data storage tables and many other applications. The key to the PROM's success is that it allows the designer to quickly and easily customize the chip to fit his unique requirements. Programmed array logic extends this programmable flexibility by utilizing fusible link technology to implement logic functions such as custom logic varying in complexity from random gates to complex arithmetic functions. Further details of a programmed array logic concept are described in the Programmed Array Logic Handbook, 3rd edition, by Monolithic Memories, Inc., of Santa Clara, Calif. 95050.

Programmed array logic implements the familiar sum of products logic by using a programmable AND array whose output terms feed a fixed OR array. Since the sum of products formed can express any Boolean transfer function, the programmed array logic circuit uses are only limited by the number of terms available in the AND-OR arrays. Programmed array logic devices may be procured in different sizes to allow for effective logic optimization and are fully described in the above-referenced Handbook.

Figure 9A:
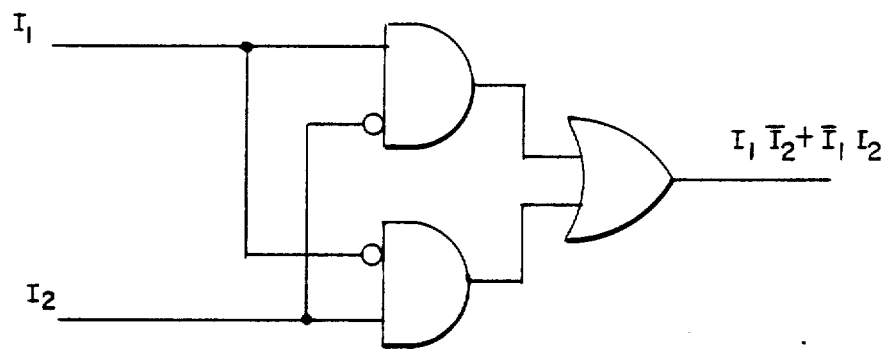
FIG. 9A is a typical combinational logic diagram.

Referring now to FIG. 9A, there is shown a normal combinatorial logic diagram for the following function:

$$Output = I_1\overline{I_2} + \overline{I_1}I_2$$

Figure 9B:
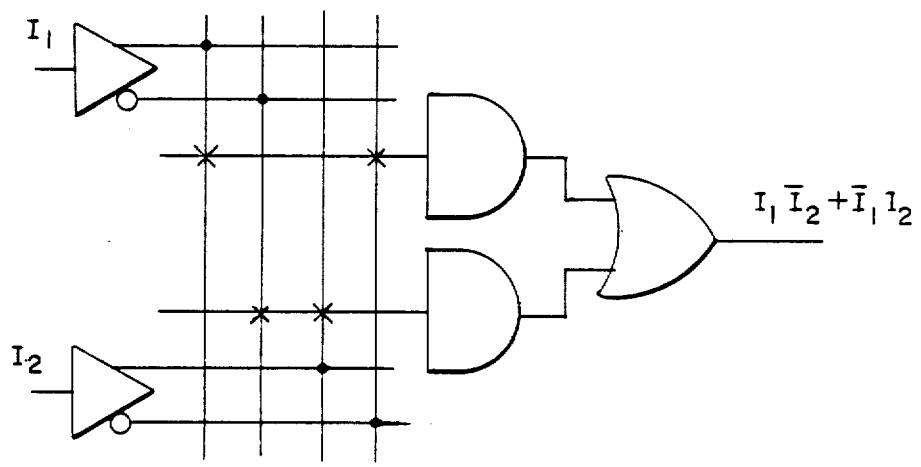
FIG. 9B is a programmable array logic equivalent diagram for the logic diagram shown in FIG. 9A.

FIG. 9B shows a programmed array logic equivalent for this transfer function. The "X" represents an intact fuse used to perform the logic AND function; however, the input terms on the common line with the X's are not connected together. The programmable array logic devices are programmed using inexpensive conventional PROM programmers with appropriate personality and socket adapter cards.

The first step in designing a programmed array logic device is selecting the pinout by examining the random logic to be replaced with a device function. The next step is to write the Boolean logic equations (in sum of products form) which will transform the inputs into the desired outputs. These explicit logic equations specify the design of a programmed array logic device precisely, and they are easily simulated and edited. Tables 1–7 show the Boolean logic equations for the programmed array logic required to implement the logic design of bus arbiter 24. By using PALASM from Monolithic Memories, Inc., which is a Fortran IV program for assembling the programmed array logic design specification and translating the logic equation to a fuse pattern, the process of designing a custom chip is automatically accomplished. PALASM also contains a simulator which exercises Function Table vectors in the logic equations. Inconsistencies between the vectors and the equations are reported as errors. The simulator also translates a function table vectors to a set of universal test vectors which may be used for functional testing after the programmed array logic device is fabricated.

Referring again to Tables 1-7 and in particular to Table 3 which specifies the programmed array logic for generating a portion of the reset signals $27_1-27_{16}$ for resetting the latched bus requests signals $46_1-46_{16}$. The first logic equation for generating RESET 1 is as follows:

RESET1 = BGRNT1*/BREQ1 + INIT + PWRON

Figure 7:
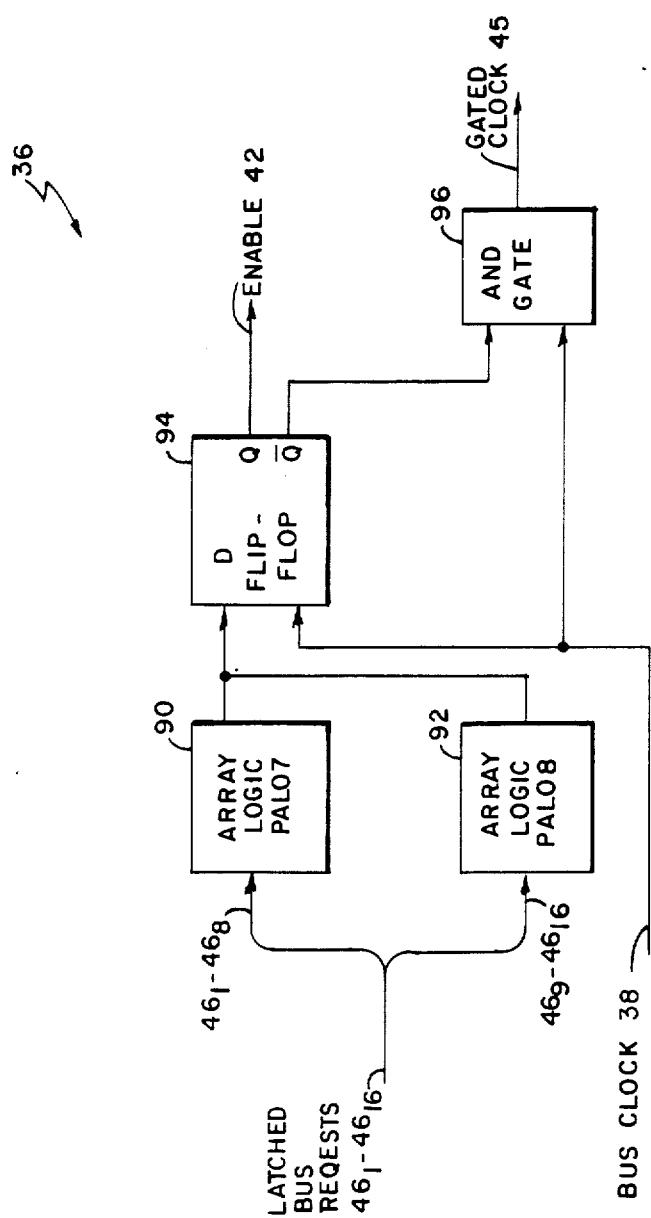
FIG. 7 is a block diagram of a bus access control logic of the invention employing programmable array logic.

This logic equation states that the RESET1 signal is generated if, and only if, a bus grant signal (BGRNT1) exists when a bus request (BREQ1) signal does not exist, or power has been turned on (PWRON) or an initialize signal (INIT) exists from a remote location. The remaining logic equations are similarly interpreted and by virtue of the chosen acronyms are essentially self-identifiable. In tables 7 and 8, the "IF" equation indicates that if any of the latched bus requests signals (LBREQ1 to LBREQ16) are active, then the respective outputs (ANYO1 to ANYO16) will be brought from a voltage level to a GROUND level. Therefore, the enable signal 42 as shown in FIG. 7 will be generated only when there are no active latched bus requests signals $46_1-46_{16}$.

Figure 3:
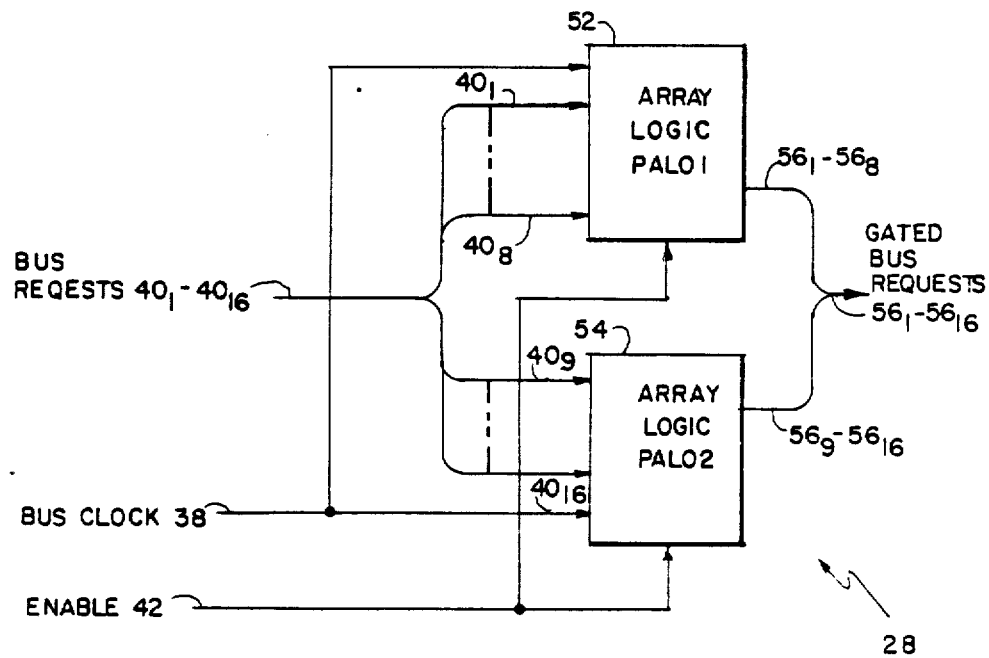
FIG. 3 is a block diagram of a bus request gate of the invention employing programmable array logic.

Referring now to FIG. 3, two programmed array logic devices, PAL01 52 and PAL02 54, are used to implement the combinational logic required for generating the gated bus requests signals $56_1-56_{16}$. PAL01 52 handles eight of the bus requests $40_1-40_8$ and PAL02 54 handles the other eight of the bus requests $40_9-40_{16}$ in conjunction with bus clock 38 and enable signal 42 as specified by the logic equations shown in Tables 1 and 2. PAL01 52 and PAL02 54 generate one or more of the gated bus requests signals $56_1-56_{16}$ (depending on the number of devices 5-20 seeking bus access) for storing in the bus request memory 30.

Figure 4:
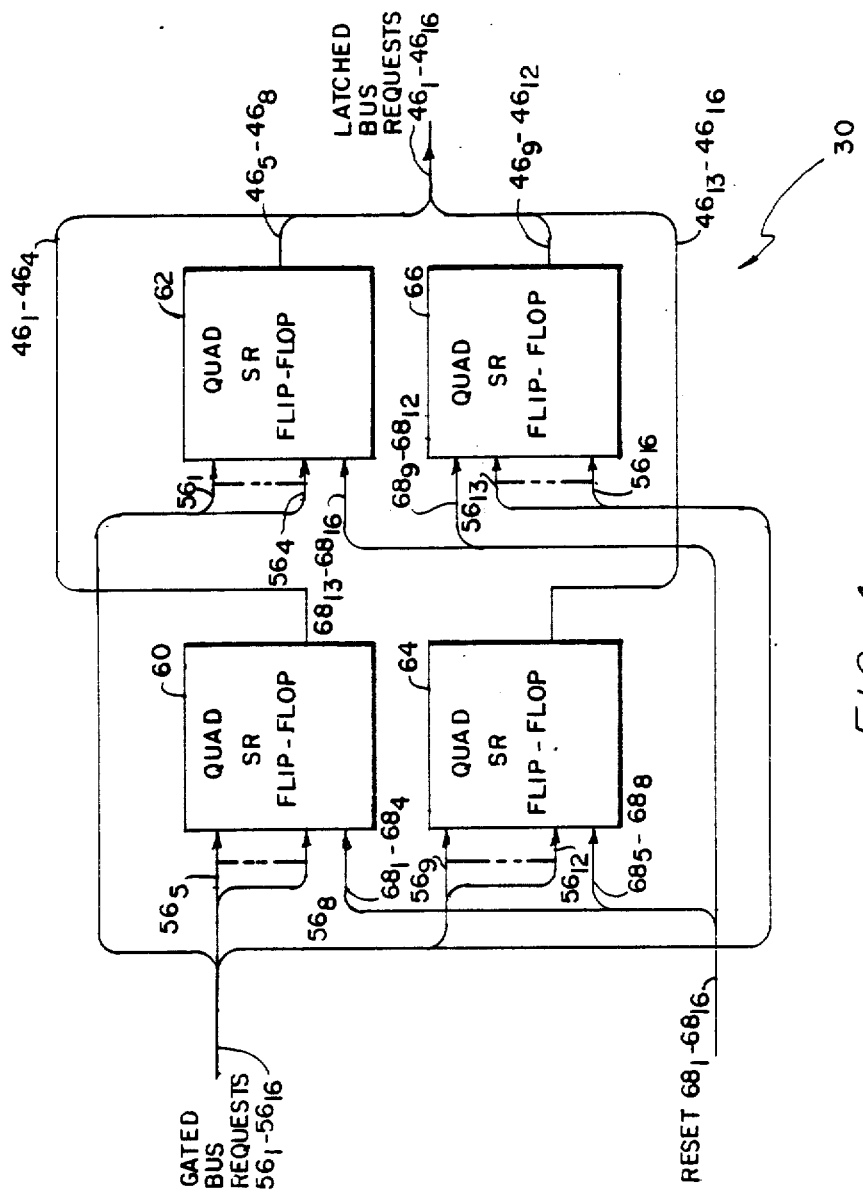
FIG. 4 is a block diagram of a bus request memory of the invention.

Referring now to FIG. 4, there is shown a plurality of QUAD SR (SET-RESET) flip-flops 60-66 for providing storage for the gated bus request signals $56_1-56_{16}$. Each SR flip-flop 60-66 may be embodied by a Texas Instrument (TI) 74LS279 Quad SR flip-flop integrated circuit (IC), which provides four storage locations per IC. Each gated bus requests $56_1-56_{16}$ signal has a storage location assigned to it within one of the SR flip-flops 60-66. Whenever there is a request from more than one device connected to bus 22, wanting access to bus 22 by generating the bus request signals $40_1-40_{16}$, priority resolver 32 converts the latched bus requests $46_1-46_{16}$ into a sequence of bus grant signals $48_1-48_{16}$ by determining the device priority of the latched bus request signals $46_1-46_{16}$.

Figure 5:
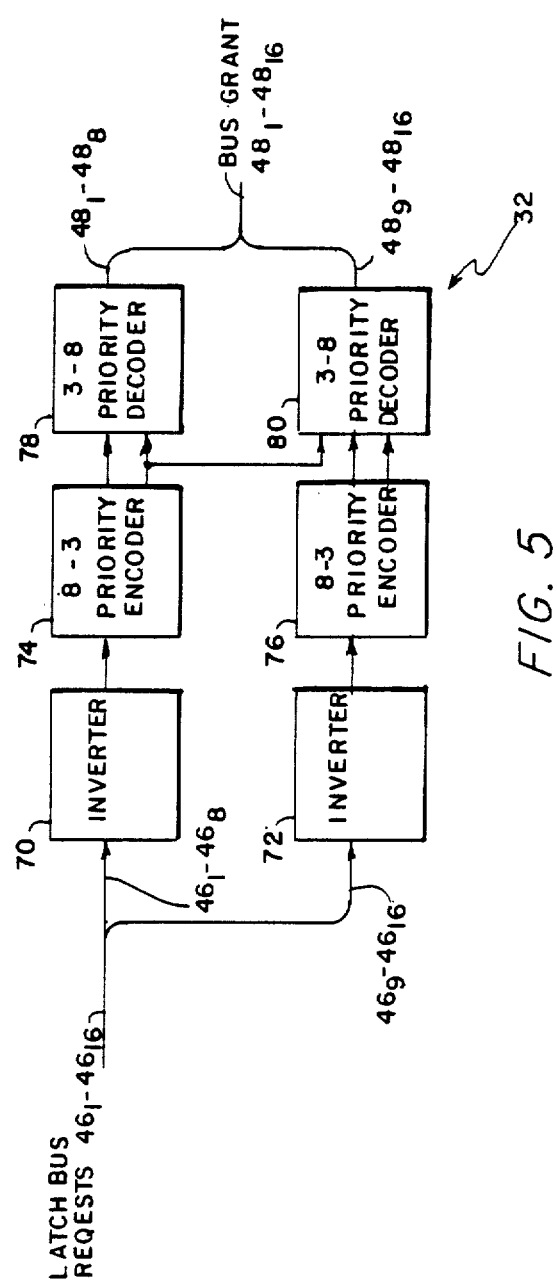
FIG. 5 is a block diagram of a priority resolver of the invention.
Figure 6:
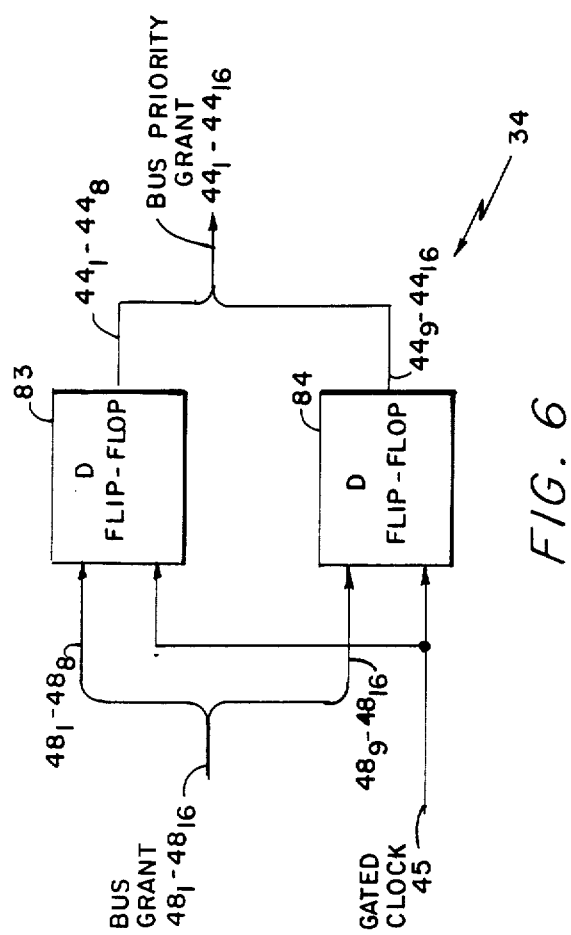
FIG. 6 is a block diagram of a bus grantor synchronizer of the invention.

FIG. 5 shows the logic devices used to implement the priority resolver 32 functions. Eight of the latched bus requests signals $46_1-46_8$ are coupled to inverter 70 which is coupled to a 8-3 priority encoder 74 which, in turn, is coupled to 3-8 priority decoders 78 and 80. The other eight latched bus requests signals $46_9-46_{16}$ are coupled to inverter 72 which is coupled to an 8-3 priority encoder 76, the output of which is coupled to 3-8 priority decoder 80. This network of encoders and decoders results in a sequence of the bus grant signals $48_1-48_{16}$ being generated based on an order of highest priority for the devices having a latched bus request signal $46_1-46_{16}$ pending. The inverters 70 and 72 may be embodied by Texas Instrument 74SO4 integrated circuits, the 8-3 priority encoders 74 and 76 may be embodied by Texas Instrument 74148 8-to-3 line octal priority encoders. The 3-8 priority decoders 78 and 80 may be embodied by Texas Instrument 74S138 3-to-8 line decoder/demultiplexer IC. Referring now to FIG. 6, when one of the bus grant signals $48_1-48_{16}$ is generated, it is synchronized with gated clock 45 using D flip-flops 83 and 84. One of the bus priority grant signals $44_1-44_{16}$ generated by the bus grantor synchronizer 34 is coupled to one of the devices 5-20 that will now be granted bus 22 access. The D flip-flops may be embodied by Texas Instrument 74S374 octal D type flip-flop integrated circuits.

Referring now to FIG. 7, the bus access enable 36 functional logic is shown. Programmed array logic devices, PAL07 90 and PAL08 92 implement the logic required to generate a series of sampling signals in the form of one or more enable signals 42 synchronized with bus clock 38. One of said enable signals 42 allows a new pending set of bus requests $40_1-40_{16}$ to be gated and stored in the bus request memory 30. The generation of a subsequent one of the sample or enable signals 42 requires that there be no latched bus requests pending which were stored in the bus request memory 30 at the occurrence of the previous enable signal 42. In addition, the gated clock signal 45 is generated in sequence with the enable signal 42 via AND gate 96. The logic equations for PAL07 90 and PAL08 92 are given in Tables 7 and 8, respectively.

Figure 8:
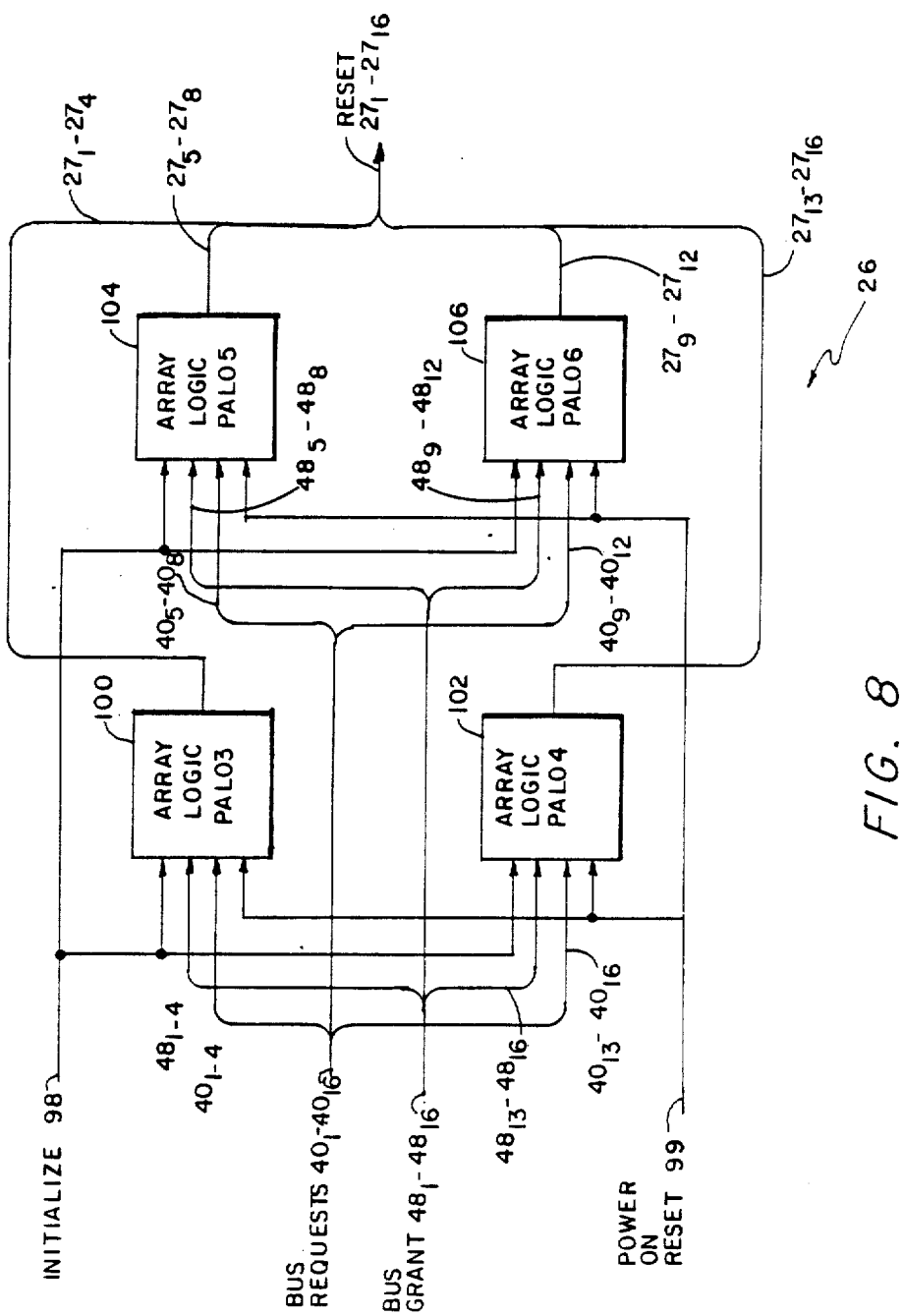
FIG. 8 is a block diagram of a bus request reset logic of the invention employing programmable array logic.

Referring now to FIG. 8, there is shown the bus request reset 26 functions which are embodied using four programmed array logic devices, PAL03, PAL04, PAL05, and PAL06, 100-106 for implementing the combinational logic required to generate the reset signals $27_1-27_{16}$. Tables 3-6 define the logic equations for the programmed array logic devices 100-106 which generate the reset signals $27_1-27_{16}$. All the reset signals $27_1-27_{16}$ reset the corresponding flip-flop in the bus request memory 30 if, and only if, a corresponding bus grant signal $48_1-48_{16}$ exists when a corresponding bus request signal $40_1-40_{16}$ does not exist, power on reset 99 occurs or an initialize 98 signal occurs.

This concludes the Description of the Preferred Embodiment. However, many modifications and alterations would be obvious to one of ordinary skill in the art without departing from the spirit and the scope of the inventive concept. For example, the bus arbiter 24 has been designed to handle bus requests from sixteen devices connected to bus 22; however, the bus arbiter 24 could readily be designed to accommodate fewer bus requests or greater bus requests than the embodiment described herein. In addition, the bus clock 38 may be provided to bus arbiter 24 as shown in FIG. 1, or may be generated within the bus arbiter 24 especially in such an embodiment comprising asynchronous devices coupled to the common bus. Therefore, it is intended that the scope of this invent be limited only by the appended claims.

TABLE 1

| PAL01 - GATED BUS REQUESTS |
| --- |
| GREQ1 = BREQ1*BCLK*ENABLE |
| GREQ2 = BREQ2*BCLK*ENABLE |
| GREQ3 = BREQ3*BCLK*ENABLE |
| GREQ4 = BREQ4*BCLK*ENABLE |
| GREQ5-BREQ5*BCLK*ENABLE |
| GREQ6 = BREQ6*BCLK*ENABLE |
| GREQ7 = BREQ7*BCLK*ENABLE |
| GREQ8 = GREQ8*BCLK*ENABLE |

TABLE 2

| PAL02 - GATED BUS REQUESTS |
| --- |
| GREQ9 = BREQ9*BCLK*ENABLE |
| GREQ10 = BREQ10*BCLK*ENABLE |
| GREQ11 = BREQ11*BCLK*ENABLE |
| GREQ12 = BREQ12*BCLK*ENABLE |
| GREQ13 = BREQ13*BCLK*ENABLE |
| GREQ14 = BREQ14*BCLK*ENABLE |
| GREQ15 = BREQ15*BCLK*ENABLE |
| GREQ16 = BREQ16*BCLK*ENABLE |

TABLE 3

| PAL03 - LATCHED BUS REQUEST RESET |
| --- |
| RESET1 = BGRNT1*/BREQ1 + INIT + PWRON |
| RESET2 = BGRNT2*/BREQ2 + INIT + PWRON |
| RESET3 = BGRNT3*/BREQ3 + INIT + PWRON |
| RESET4 = BGRNT4*/BREQ4 + INIT + PWRON |

TABLE 4

| PAL04 - LATCHED BUS REQUEST RESET |
| --- |
| RESET5 = BGRNT5*/BREQ5 + INIT + PWRON |
| RESET6 = BGRNT6*/BREQ6 + INIT + PWRON |
| RESET7 = BGRNT7*/BREQ7 + INIT + PWRON |
| RESET8 = BGRNT8*/BREQ8 + INIT + PWRON |

TABLE 5

| PAL05 - LATCHED BUS REQUEST RESET |
| --- |
| RESET9 = BGRNT9*/BREQ9 + INIT + PWRON |
| RESET10 = BGRNT10*/BREQ10 + INIT + PWRON |
| RESET11 = BGRNT11*/BREQ11 + INIT + PWRON |
| RESET12 = BGRNT12*/BREQ12 + INIT + PWRON |

TABLE 6

| PAL06 - LATCHED BUS REQUEST RESET |
| --- |
| RESET13 = BGRNT13*/BREQ13 + INIT + PWRON |
| RESET14 = BGRNT14*/BREQ14 + INIT + PWRON |
| RESET15 = BGRNT15*/BREQ15 + INIT + PWRON |
| RESET16 = BGRNT16*/BREQ16 + INIT + PWRON |

TABLE 7

| PAL07 - ENABLE RECEPTION OF BUS REQUESTS |
| --- |
| IF (LBREQ1) ANY01 = GROUND |
| IF (LBREQ2) ANY02 = GROUND |
| IF (LBREQ3) ANY03 = GROUND |
| IF (LBREQ4) ANY04 = GROUND |
| IF (LBREQ5) ANY05 = GROUND |
| IF (LBREQ6) ANY06 = GROUND |
| IF (LBREQ7) ANY07 = GROUND |
| IF (LBREQ8) ANY08 = GROUND |

TABLE 8

| PAL08 - ENABLE RECEPTION OF BUS REQUESTS |
| --- |
| IF (LBREQ9) ANY09 = GROUND |
| IF (LBREQ10) ANY10 = GROUND |
| IF (LBREQ11) ANY11 = GROUND |
| IF (LBREQ12) ANY12 = GROUND |
| IF (LBREQ13) ANY13 = GROUND |
| IF (LBREQ14) ANY14 = GROUND |
| IF (LBREQ15) ANY15 = GROUND |
| IF (LBREQ16) ANY16 = GROUND |

What is claimed is:

1. In combination:

a plurality of devices including memories, processors, and I/O controllers operating asynchronously;

a common bus means for interconnecting said plurality of devices;

means coupled to said plurality of devices for sampling and storing bus request signals from said devices in response to a sampling signal, providing there are no previously stored bus request signals waiting to be processed;

means coupled to said sampling and storing means for converting said bus request signals into a priority sequence of bus granting signals means coupled to an output of said sampling and storing means for producing said sampling signal in accordance with a continuous clock signal originating from said common bus means and the absence of any previously stored bus request signals, each sampling signal being produced after said converting means converts all of said previously sampled and stored bus request signals into said priority sequence of bus granting signals; and means coupled to said priority converting means and said sampling signal producing means for synchronizing in accordance with said clock signal said prioritized bus granting signals coupled to said plurality of devices.

2. The combination as recited in claim 1 wherein:

said sampling and storing means being coupled to a reset means for generating a reset signal for each one of said stored bus requests after converting said stored bus request signals to said priority sequence of bus granting signals.

3. The combination as recited in claim 1 wherein:

said converting means determines said priority sequence of bus granting signals by determining which one of said devices receives one of said bus granting signals before the other devices.

4. In combination:

a bus;

a plurality of devices including memories, processors, and I/O controllers operating asynchronously and interconnected by said bus, each one of said devices produces a bus access request signal on a bus access request line connected to an output thereof when said one of the devices requests access to said bus, and each one of said devices being granted access to said bus in response to a bus access grant signal fed to said one of the devices on a bus access grant line connected to an input of said one of the devices;

means, having an input connected to said bus access request line of each one of said plurality of devices for storing the bus access request signal on said bus access request line in response to a sample signal generated in accordance with a continuous clock signal originating from said bus and providing there are no previously stored bus access request signals waiting to be processed;

means, responsive to said stored bus access request signals, for converting the stored bus access request signals into a priority sequence of bus access grant signals on said bus access grant lines, said bus access grant lines being coupled to the devices requesting access to the bus;

means coupled to an output of said storing means for producing the sample signal in accordance with said clock signal and the absence of any stored bus access request signals, each sample signal being produced after all of said bus access request signals stored in response to a preceding sample signal have been converted into said priority sequence of bus access grant signals; and means coupled to said priority converting means and said sample signal producing means for synchronizing in accordance with said clock signal said prioritized bus access grant signals coupled to said plurality of devices.

5. The combination as recited in claim 4 wherein:

said storing means being coupled to a reset means for generating a reset signal for each one of said stored bus access request signals after converting said stored bus access request signals into said sequence of bus access grant signals.

6. The combination as recited in claim 4 wherein:

said converting means determines which one of said devices that generated one of said bus request signals receives one of said bus granting signals before the other devices.

7. In combination:

a plurality of devices including memories, processors and I/O controllers operating asynchronously;

a common bus means for interconnecting said plurality of devices;

means coupled to said plurality of devices for sampling and storing a plurality of bus requests from said devices in response to a sampling signal generated in accordance with a continuous clock signal originating from said common bus means and providing there are no previously stored bus requests waiting to be processed;

means coupled to an output of said sampling and storing means and to an input line providing said continuous clock signal for generating said sampling signal when all previously stored bus requests have been processed;

means coupled to said output of said bus request sampling and storing means for determining which one of said bus requests has highest priority for granting one of said devices that generated said highest priority bus request access to said common bus means, said priority determining means permitting all of said sampled bus requests to obtain sequential access to said common bus means prior to the generation of a next one of said sampling signals; and means coupled to said highest priority determining means and said sampling signal generating means for synchronizing in accordance with said clock signal access to said bus means of each one of said plurality of devices having highest priority.

8. The combination as recited in claim 7 wherein:

said priority determining means being coupled to a reset means for resetting each one of said stored bus requests after said one of said devices has been granted bus access.

9. The combination as recited in claim 7 wherein:

said priority determining means generates a bus grant signal for said one of said devices being granted bus access.

10. In combination:

a plurality of devices including memories, processors and I/O controllers operating asynchronously;

a common bus means for interconnecting said plurality of devices;

means coupled to said plurality of devices for gating a first plurality of bus requests from said devices in response to a sampling signal generated in accordance with a continuous clock signal originating from said common bus means and providing there are no previously stored bus requests waiting to be processed;

means coupled to said gating means for storing said bus requests;

means coupled to said bus request storing means for determining a highest priority one of said stored bus requests and generating a bus grant signal;

means coupled to said highest priority determining means for generating said prioritized bus grant signal, synchronized in accordance with said clock signal, for each one of said devices determined to have said highest priority of said stored bus requests;

means coupled to said bus request storing means for resetting each one of said stored bus requests in response to said bus grant signal being fed to one of said devices that generated said bus request signal; and means coupled to an output of said storing means for generating said sampling signal in accordance with said clock signal and providing all outputs of said storing means representing previously stored bus requests are reset.

11. A bus arbiter for providing a plurality of asynchronously operating devices including memories, processors and I/O controllers prioritized, equal access to a common bus means of a digital system in response to bus access requests from said devices, the arbiter comprising:

means for sampling and storing a plurality of said bus requests in response to a sampling signal generated in accordance with a continuous clock signal originating from said common bus means and providing there are no previously stored bus requests waiting to be processed;

means coupled to an output of said sampling and storing means and to an input line providing said continuous clock signal for generating said sampling signal; and means coupled to said output of said sampling and storing means for determining which one of said bus requests has a highest priority for granting one of said devices that generated said highest priority bus request access to said common bus means, said determining means permitting all of said sampled bus requests to obtain prioritized sequential access to said common bus means prior to the generation of a next one of said sampling signal; and means coupled to an output of said priority determining means for synchronizing in accordance with said clock signal said granting of each one of said devices access to said common bus means.

12. The combination as recited in claim 11 wherein:

said priority determining means being coupled to a reset means for resetting each one of said stored bus requests after said one of said devices has been granted bus access.

13. The combination as recited in claim 11 wherein:
said priority determining means generates a bus grant signal for said one of said devices being granted bus access.

14. A bus arbiter for providing a plurality of asynchronously operating devices including memories, processors and I/O controllers prioritized, equal access to a common bus of a digital system in response to bus access requests from said devices, the arbiter comprising:
means coupled to said plurality of devices for sampling and storing a first plurality of said bus requests in response to a sampling signal generated in accordance with a continuous clock signal originating from said common bus and providing there are no previously stored bus requests waiting to be processed;
means coupled to said sampling and storing means for generating said sampling signal in response to an output of said sampling and storing means indicating there are no previously stored bus requests waiting to be processed and to an input line providing said continuous clock signal;
means coupled to said output of said bus request sampling and storing means for generating a sequence of bus grant signals based on a preferred priority order of said bus requests from said devices;
means coupled to an input of said sampling and storing means for resetting one of said stored bus requests for one of said devices having generated said one of said stored bus requests, in response to one of said bus grant signals in said sequence for said one of said devices; and
means coupled to said output of said priority generating means for synchronizing in accordance with said clock signal said prioritized bus grant signals coupled to said plurality of devices.

15. The method of providing a plurality of asynchronously operating devices including memories, processors and I/O controllers with prioritized, equal access to a common bus of a digital system comprising the steps of:
sampling and storing bus request signals from said devices in response to a sampling signal generated in accordance with a continuous clock signal originating from said common bus and providing there are no previously stored bus request signals waiting to be processed;
converting said bus request signals into a priority sequence of bus granting signals;
producing said sampling signal in accordance with said clock signal and the absence of any previously stored bus request signals, each sampling signal being produced after said converting step converts said sampled and stored bus request signals into said priority sequence of bus granting signals; and
synchronizing said sequence of prioritized bus granting signals coupled to said plurality of devices in accordance with said clock signal.

16. The method of providing a plurality of asynchronously operating devices including memories, processors and I/O controllers with prioritized, equal access to a common bus of a digital system in response to bus access requests from said devices comprising the steps of:
sampling a first plurality of said bus requests in response to a sampling signal generated in accordance with a continuous clock signal originating from said common bus and providing there are no previously stored bus requests waiting to be processed;
storing said plurality of sampled bus requests in a memory means;
generating a priority sequence of bus grant signals based on a highest priority order of said bus requests from said devices to obtain bus access based on said one of said devices having the highest priority of said sampled bus requests;
resetting each one of said stored bus requests, for each one of said devices having generated said one of said stored bus requests, immediately following said generating of each one of said bus grant signals in said sequence;
generating said sampling signal in accordance with said clock signal and providing all outputs of said storing means representing previously memory bus requests are reset; and
synchronizing said sequence of prioritized bus grant signals coupled to said plurality of devices in accordance with said clock signal.

* * * * *